United States Patent
Sartori et al.

(10) Patent No.: US 6,258,258 B1
(45) Date of Patent: Jul. 10, 2001

(54) PROCESS FOR TREATMENT OF PETROLEUM ACIDS WITH AMMONIA

(75) Inventors: Guido Sartori, Annandale; David William Savage, Lebanon; William Neergaard Olmstead, Murray Hill; Winston Karl Robbins, New Providence; David Craig Dalrymple; Bruce Henry Ballinger, both of Bloomsbury, all of NJ (US)

(73) Assignee: Exxon Research and Engineering Company, Annandale, NJ (US)

( * ) Notice: Subject to any disclaimer, the term of this patent is extended or adjusted under 35 U.S.C. 154(b) by 0 days.

(21) Appl. No.: 09/399,650

(22) Filed: Sep. 21, 1999

Related U.S. Application Data

(63) Continuation-in-part of application No. 09/166,807, filed on Oct. 6, 1998, now abandoned.

(51) Int. Cl.$^7$ .................................................. C10G 17/00
(52) U.S. Cl. ........................ 208/263; 208/47; 208/348; 208/48 AA
(58) Field of Search ........................ 208/263, 47, 48 AA

(56) References Cited

U.S. PATENT DOCUMENTS

| | | | |
|---|---|---|---|
| 2,302,281 | 11/1942 | Watkins | 252/50 |
| 3,766,053 | 10/1973 | Seffens | 208/47 |
| 4,199,440 | 4/1980 | Verachtert | 208/230 |
| 4,457,837 | * 7/1984 | Farnham | 208/47 |
| 4,634,519 | 1/1987 | Danzik | 208/263 |
| 4,647,366 | 3/1987 | Edmondson | 208/47 |
| 4,855,035 | 8/1989 | Schutt | 208/47 |
| 5,039,398 | 8/1991 | Stine et al. | 208/192 |
| 5,182,013 | 1/1993 | Petersen et al. | 208/348 |
| 5,643,439 | 7/1997 | Sartori et al. | 208/47 |
| 5,683,626 | 11/1997 | Sartori et al. | 252/389.62 |
| 5,714,664 | 2/1998 | Femside et al. | 585/950 |

FOREIGN PATENT DOCUMENTS

| | | | |
|---|---|---|---|
| 469573 | 7/1937 | (GB) . | |
| WO97/08270 | 3/1997 | (WO) | C10G/19/00 |
| WO97/08271 | 3/1997 | (WO) | C10G/19/00 |
| WO97/08275 | 3/1997 | (WO) | C10G/71/00 |

OTHER PUBLICATIONS

Scattergood et al, Corrosion '87, Paper No. 197, Mar. 9–13, 1987, CA, pp. 197/1–197/5.
Kalichevsky et al, Petroleum Refining with Chemicals, Elsevier Publishing Co., Chapter 4, 1956.
Streitwieser et al, Introduction to Organic Chemistry, Chapters 18–19.
Camp et al, Neutralization as a Means of Controlling Corrosion of Refinery Equipment, National Association of Corrosion Engineers, vol. 6, pp. 39–44 (Feb. 1950).
Gutzert, Nap. Acid Corros. In Oil Refineries Corrosion/76 (Mar. 1976).
Morrison & Boyd, Organic Chemistry 5th ed., p. 870.
Conant & Blatt, The Chem. of Organic Compounds 5th ed., p. 176.
Caffey, ed, Rodd's Chemistry of Carbon Compounds vol. I, Part C, p. 166 (1965).
Kirk–Othmer Encycl. Of Chem. Technology, 4th ed., vol. 2, p. 340.

* cited by examiner

*Primary Examiner*—Helane E. Myers
(74) *Attorney, Agent, or Firm*—Linda M. Scuorzo

(57) ABSTRACT

The present invention is a process for decreasing the acidity of a starting acidic crude oil by contacting an acidic crude with an effective excess of ammonia dissolved in said crude to form an ammonia-continuous oil discontinuous phase at a temperature and conditions sufficient to form the corresponding amide of the naphthenic acids. The process is useful in the processing of acidic crudes.

10 Claims, No Drawings

PROCESS FOR TREATMENT OF PETROLEUM ACIDS WITH AMMONIA

This application is a Continuation-in-Part under 37 CFR 1.53 (b) of U.S. Ser. No. 09/166,807 filed Oct. 6, 1998 now abandoned.

FIELD OF THE INVENTION

The present invention relates to a process for neutralizing petroleum acids.

BACKGROUND OF THE INVENTION

Whole crudes and crude fractions with high petroleum acid content such as those containing naphthenic acids are corrosive to the equipment used to extract, transport and process the crude.

Efforts to minimize naphthenic acid corrosion have included a number of approaches for neutralizing and removing the acids from the oil. For example, U.S. Pat. No. 2,302,281 and Kalichevsky and Kobe in *Petroleum Refining with Chemicals* (1956), Chapter 4, disclose various base treatments of oils and crude fractions, e.g., using bases such as ammonia (page 170). U.S. Pat. No. 4,199,440 discloses treatment of a liquid hydrocarbon with a dilute aqueous alkaline solution, specifically dilute aqueous NaOH or KOH. U.S. Pat. No. 5,683,626 teaches treatments of acidic crudes with tetraaylammonium hydroxide and U.S. Pat. No. 5,643,439 uses trialkylsilanolates. PCT US96/13688, US/13689 and US/13690 (Publ. WO 97/08270, 97/08271 and 97/08275 dated Mar. 6, 1997) teach the use of Group IA and IIA oxides and hydroxides to treat whole crudes and crude fractions to decrease naphthenic acid content. U.S. Pat. No. 4,300,995 discloses the treatment of carbonous material particularly coal and its products, heavy oils, vacuum gas oil and petroleum resids having acidic functionalities with a dilute quaternary base, such as tetramethylammonium hydroxide in a liquid (alcohol or water). This patent was aimed at improving yields and physical characteristics of the products and did not address the question of acidity reduction.

U.S. Pat. No. 4,457,837 to Farnham teaches a process for treating corrosive aqueous condensate acid released from petroleum following distilation, i.e., acidic materials such as HCl and $H_2S$, not organic condensate. In the process the concentration of water is very high as evidenced by the requirement of a separate aqueous ammonia phase and a hydrocarbon phase. Farnham is silent on the need to form amides in the treatment process and, indeed the presence of large quantities of water disfavors such a reaction.

U.S. Pat. No. 4,634,519 to Danzik teaches a neutralization reaction of naphthenic acids upon extraction into the aqueous methanolic phase to produce ammonium salts of the naphthenic acids and requires the presence in critical ratios of alkanols, water and ammonia. Danzik indicates that about 20% water is required which is consistent with Danzik's teaching of an aqueous ammonia phase. The reference is selective and specifically states that it cannot be successfully applied to treatment of crude oils in general.

While these processes have achieved varying degrees of success there is a continuing need to develop more efficient methods for treating acidic crudes.

SUMMARY OF THE INVENTION

The present invention relates to a process for decreasing the acidity of an acidic crude oil by contacting the acidic crude oil with an effective excess of ammonia in the presence of water in an amount not to exceed the solubility limit of the water in the crude (i.e., essentially anhydrous) at a temperature and under conditions sufficient to form the corresponding amide of the naphthenic acids. Additionally, the process may be carried out in two steps by pretreating an acidic crude oil with an effective excess of ammonia in the presence of water in an amount not to exceed the solubility limit of the water in the crude (i.e., essentially anhydrous) at a temperature and under conditions sufficient to form the corresponding ammonium salts of the naphthenic acids, and then treating the resulting crude containing ammonium salts of the naphthenic acid at a temperature and under conditions sufficient to form the corresponding amides of the naphthenic acid.

The present invention may suitably comprise, consist or consist essentially of the elements disclosed and may be practiced in the absence of an element not disclosed.

DETAILED DESCRIPTION OF THE INVENTION

Some crude oils contain organic acids that contribute to corrosion or fouling of refinery equipment and that are difficult to separate from the processed oil. The organic acids generally fall within the category of naphthenic and other organic acids. Naphthenic acid is a generic term used to identify a mixture of organic acids present in petroleum stocks. Naphthenic acids may be present either alone or in combination with other organic acids, such as phenols. Naphthenic acids alone or in combination with other organic acids can cause corrosion at temperatures ranging from about 65° C. (150° F.) to 420° C. (790° F.).

Applicants have discovered that if a crude is treated with ammonia at conditions at which an excess of ammonia is not present the resulting ammonium salt of the naphthenic acid is formed, and on subsequent heating in the absence of additional (or a sufficient excess of) ammonia or at insufficient temperature as can occur, for example, in further refining of a crude oil, this salt decomposes to give ammonia and the naphthenic acid. Thus, a critical step of Applicants' invention is to ensure that the corresponding amide is produced. This is accomplished by heating the crude oils under conditions such that any ammonium salt of the naphthenic acid is converted into the corresponding amide. This requires the presence of ammonia and in sufficient excess concentration in the presence of only trace amounts of water, i.e., in the presence of water in an amount not to exceed the solubility limit of the water in the crude, at a temperature to produce the corresponding amide. Prior art processes using higher levels of water (i.e., aqueous ammonia or predominately water containing systems) produce naphthenic acid salts rather than amides. The resulting amide is heat stable in that it does not decompose to ammonia and the naphthenic acid.

The crudes that may be used are any naphthenic acid-containing whole crude oils that are liquid, liquifiable or vaporizable at the temperatures at which the present invention is carried out. As used herein the term whole crudes means unrefined, non-distilled crudes. The acidic crudes are preferably whole crudes. However, fractions of whole crudes also may be treated. An additional benefit of the treatment process is the minimization of ash formation in the event that resulting crude or fraction is to be subsequently burned.

Crudes typically contain amounts of water but also may be anhydrous or essentially anhydrous. Suitable crudes may be anhydrous or may contain traces of water (i.e., water in an amount not greater than the solubility limit of the water in the crude and thus is insufficient to form a separate aqueous, phase). Dewatering/desalting of water-containing crude to the required level for use in Applicants' process may be carried out by methods known to those skilled in the art.

Applicants' treatment can be carried out using a staged or sequential treatment of the acidic crude with a sufficient excess of ammonia. The temperature in any given stage should not exceed the cracking temperature of the oil. When a one step treatment is used the conditions must be sufficient to form the amide of the naphthenic acid. Typically, treatment at temperatures above about 150–350° C., preferably above about 180–350° C. and in the presence of an effective excess of ammonia are used. Typically, for the two stage treatment in the first stage the temperature is from about 10° C. to 100° C. preferably 20° C. to 50° C. and in the second stage the temperature is greater than the temperature in the first stage and sufficient to produce amidation, typically above about 150–350° C., preferably above about 180–350° C. Pressures are autogenous pressures, typically from 100 to 300 kPa and may be the same or different in the two steps. In the two step process, the ratio of crude to ammonia is sufficient to produce the corresponding ammonium salt in the first step, and sufficient to produce the corresponding amide in the second step. Typically, a large molar excess of ammonia to the naphthenic acid (or of ammonia to ammonium salt) is used, typically at least a threefold (3:1) molar excess of ammonia, more desirably at least a five fold molar excess in a given stage.

The ammonia is dissolved in the crude oil to form an ammonia-in-oil-phase. Thus suitable crudes are those hat are anhydrous or essentially anhydrous, i.e., in which the amount of water is less than that which results in a separate water phase.

Optionally, the excess, unreacted ammonia may be recovered and reused in either a batch or continuous process to contact additional untreated crude.

The ammonia may be in a suitable solution preferably in a solvent which is inert to naphthenic acids or non-aqueous and is available from commercial sources.

Contacting times in each step depend on the nature of the crude to be treated, its acid content, but typically may be carried out from a few minutes to 8 hours.

The first and second steps may be carried out sequentially either in batch (in one vessel with addition of one charge or separate stepwise additions of multiple charges of excess ammonia) or in multiple vessels (typically two).

The concentration of acid in the crude oil is typically expressed as an acid neutraliation number or acid number, which is the number of milligrams of KOH required to neutralize the acidity of one gram of oil. It may be determined according to ASTM D-664. Any acidic crude may be treated according to the present invention, for example, crudes having an acid neutralization number of from 0.5 to 10 mg KOH/g acid. Typically, the decrease in acid content may be determined by a decrease in the neutalizaton number or in the intensity of the carboxyl band in the infrared spectrum at about 1708 cm$^{-1}$. Whole crude oils with acid numbers of about 1.0 and lower are considered to be of moderate to low corrosivity. Crudes with acid numbers greater than about 1.5 are considered corrosive. Acidic crudes having free carboxyl groups may be effectively treated using the process of the present invention.

Whole crude oils are very complex mixtures containing a wide range of contaminants and in which a large number of competing reactions may occur. Thus, the reactivity of particular compounds to produce the desired neutralization is not predictable. Unexpectedly, in the current two step process the acidity of the crude is effectively decreased by a greater amount in comparison to a one step treatment process carried out at the same conditions using the same total amount of ammonia as is evidenced by a comparison of Example 2 (two steps) and Example 4 (one step). Additionally, use of an excess of ammonia sufficient to ensure the formation of the corresponding amide of the naphthenic acid either in the one step or a two step process of the present invention produces a greater decrease in acidity than use of a lower ratio (sub-excess) of ammonia to naphthenic acid groups under conditions that do not result in amide formation.

Beneficially, the treatment produces a treated crude (or distillation residue derived therefrom) that will not produce ash when burned, unlike crudes treated with inorganic oxides and hydroxides. The amide remains dissolved in the crude.

The present invention may be used in applications in which a reduction in the acidity of an acidic whole crude would be beneficial.

The present invention may be demonstrated with reference to the following non-limiting examples.

GENERAL CONDITIONS

Titration of the carboxyl groups with KOH was carried out according to ASTM D-664. In addition, the extent of conversion of the naphthenic acids to the corresponding amides can be established by infrared spectroscopy. The reactions were carried out in a 300 ml autoclave, unless otherwise noted. Pressure during the amidation step was 300 kPa.

EXAMPLE 1

The reactions were carried out in an autoclave with a 300 ml capacity.

100 g of Gryphon crude, having a total acid number of 4.2 mg KOH/g of oil, determined by infrared spectroscopy, was put into the autoclave. The autoclave was then pressurized to 300 kPa with anhydrous ammonia without prior air removal. The oil was stirred at room temperature at 450 rpm for 24 hours. Examination of the reaction product by infrared spectroscopy showed that the band at 1708 cm$^{-1}$, attributed to carboxyl groups, had been reduced by 92%. A broad band at 1560 cm$^{-1}$ that was not present in the untreated Gryphon crude showed the formation of ammonium salts.

In the second step the treated Gryphon crude was heated in the same autoclave to 190° C. and stirred at 450 rpm while anhydrous ammonia was passed attributed to ammonium salts. The presence of a broad band with its maximum at 1680 cm$^{-1}$ was attributed to the formation of corresponding amides. Further examination by use of KOH titration showed a total acid number (TAN) of 2.7 mg KOH/g of oil for the reaction product This was a 36% reduction in total acid number from the untreated Gryphon crude.

EXAMPLE 2

Example 1 was repeated, increasing the reaction temperature of the second step to 220° C. Examination by KOH titration showed a total acid number (TAN) of 1.5 mg KOHg of oil. This was a 64% reduction in total acid number from the untreated Gryphon crude. The infrared spectrum of the product was similar to that in Example 1, and showed a 76% reduction in carboxyl groups.

The product was heated to 350° C. for 3 hours in an autoclave to see if a higher temperature would reverse the amidation reaction. The heated product had a resulting total acid number (TAN) of 1.4 mg KOH/g of oil. Examination by infrared spectroscopy showed complete disappearance of the band at 1680 cm$^{-1}$, attributed to the amide groups. The band at 1708 cm$^{-1}$, attributed to carboxyl groups was unchanged in intensity. A weak band at 2246 cm$^{-1}$ showed formation of nitrile groups.

EXAMPLE 3

Example 1 was repeated, increasing the reaction temperature of the second step to 270° C. Examination by KOH titration showed a total acid number (TAN) of 1.8 mg KOH/g of oil. This was a 57% reduction in total acid number from the untreated Gryphon crude. Infrared spectroscopy showed a 92% reduction of intensity of the band at 1708 cm$^{-1}$, attributed to carboxyl groups. A band at 1680 cm$^{-1}$ showed formation of amide groups.

The product was heated to 300° C. for 3 hours in an autoclave. The resulting product had a total acid number (TAN) of 2.2 mg KOH/g of oil.

EXAMPLE 4

In this experiment there was no pre-neutralization of the Gryphon crude. The first step of Example 2 was eliminated. The Gryphon crude was directly reacted with flowing ammonia gas at 220° C. The ammonia flow rate was 2 mls/minute and the reactants were mixed at 450 rpm for 7½ hours. Examination of the reaction product by infrared spectroscopy showed a similar spectrum as Example 1 except the amide peak with its maximum at 1680 cm$^{31\ 1}$, was smaller and the ammonium salt peak at 1560 cm$^{-1}$ was larger. Titration by KOH showed a total acid number (TAN) of 2.9 mg KOH/g of oil.

EXAMPLE 5

Example 2 was repeated but the flow rate of ammonia gas was increased to 4 mls/minute. The infrared spectrum was similar to that in Example 2. The KOH titration showed a total acid number (TAN) of 1.7 mg KOH/g of oil. This was a 60% reduction in total acid number from untreated Gryphon crude.

EXAMPLE 6

The reaction apparatus was the 300 ml autoclave described in Example 1. 100 g of Gryphon crude were placed in the autoclave. Some gaseous ammonia was passed through the autoclave to remove air. Then the autoclave was pressurized to 300 kPa with ammonia gas and stirred at 450 rpm at room temperature for 24 hours. Then the autoclave was heated at 220° C. with stirring for 7 hours without NH$_3$ flow.

After cooling, titration according to ASTM D-664 showed a total acid number of 1.3 mg KOH/g of oil corresponding to a 69% reduction in acidity compared to untreated Gryphon. Infrared spectroscopy showed a band at 1680 cm$^{-1}$, indicating formation of amide groups. The band at 1708 cm$^{-1}$, attributed to carboxyl groups was a small shoulder, partly superimposed on the amide peak. Based on its intensity, 83% of the original carboxyl groups had been converted to amides.

EXAMPLE 7

The reaction apparatus was the 300 ml autoclave described in Example 1. 100 g of Gryphon crude were put into the autoclave, which was then closed and swept with ammonia gas to displace air. Then the autoclave was pressurized to 300 kPa with ammonia gas and stirred at room temperature for 24 hours. Then the autoclave was brought to 280° C. and stirred at 450 rpm for 7 hours without NH$_3$ flow.

After cooling, the oil was titrated with KOH according to ASTM D-664. The total acid number was 0.6 mg KOH/g of oil, corresponding to an 86% reduction of the original acidity.

What is claimed is:

1. A process for decreasing the acidity of a start acidic crude oil, comprising:

contacting an acidic crude with an effective excess of ammonia at a temperature and under conditions sufficient to form the corresponding amide.

2. A process for decreasing the acidity of a starting acidic crude, comprising:

(a) contacting an acidic crude oil with an effective excess of ammonia at a temperature and under conditions sufficient to form the corresponding ammonium salt; and (b) contacting product of step (a) with an effective excess of ammonia at a temperature sufficient to form the corresponding amide of the naphthenic acid.

3. The process of claim 2 wherein the temperature of step (b) is substantially greater than the temperature of step (a).

4. The process of claim 1 wherein the oil is a naphthenic acidcontaining crude oil.

5. The process of claim 1 or 2 (a) wherein contacting is carried out at a pressure from 100 to 400 kPa.

6. The process of claim 1 or 2 (b) wherein contacting is carried out at a pressure of from 200 to 400 kPa.

7. The process of claim 2 (a) wherein the temperature is from 20° C. to 50° C.

8. The process of claim 1 or 2 (b) wherein the temperature is above about 180° C.

9. The process of claim 1 or 2 wherein the ammonia is present in at least a threefold molar excess to naphthenic acid in each step.

10. The process of claim 1 or 2 wherein the ammonia is present in at least a fivefold excess in each step.

* * * * *